Sept. 11, 1928.
J. O. CARREY
1,683,955
BELT DRIVE FOR REFRIGERATING MACHINES
Filed April 3, 1926
2 Sheets-Sheet 1
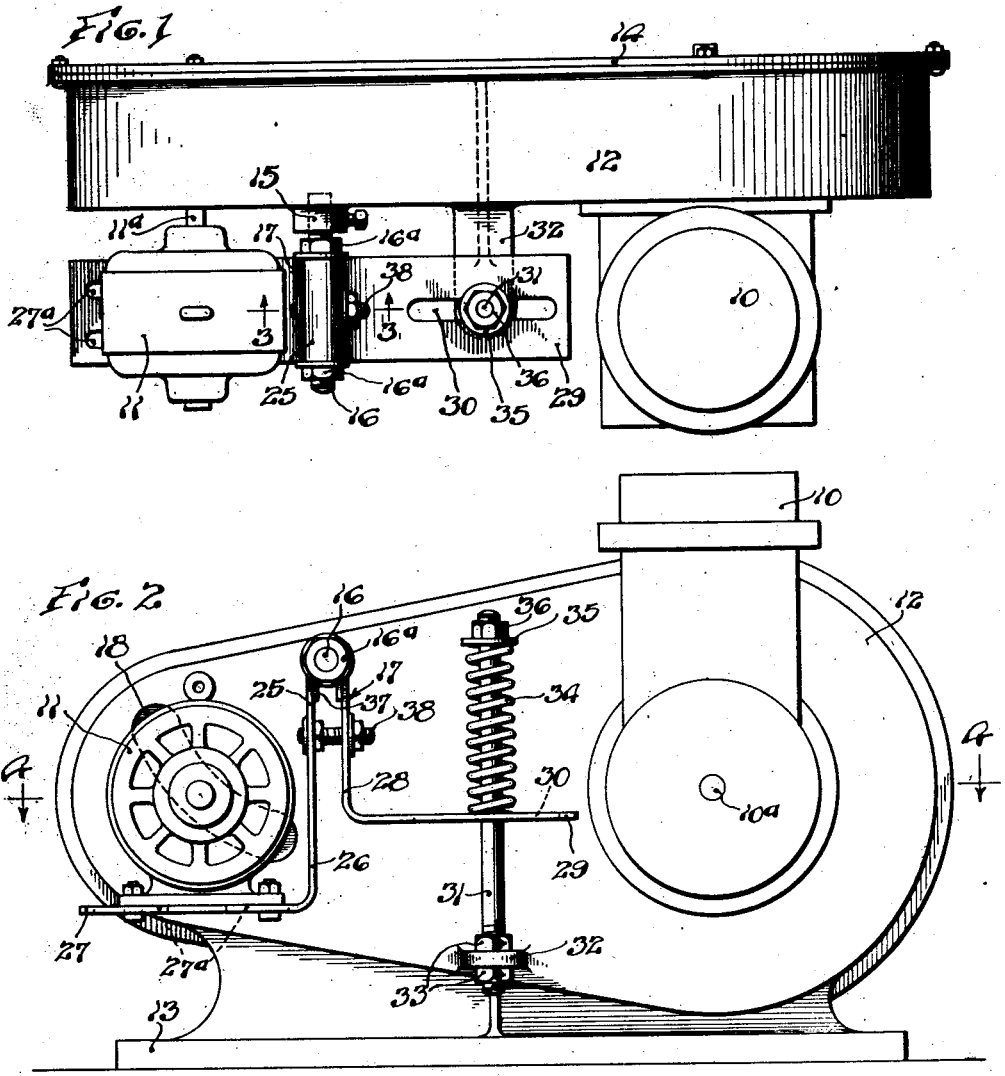
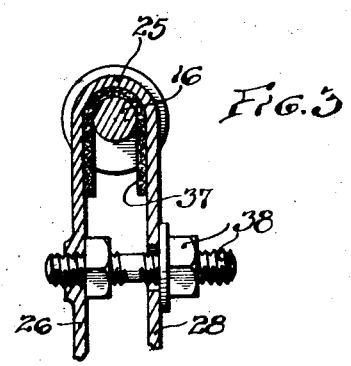
INVENTOR:
John O. Carrey
By Cornwall, Bedell & Janney
ATTYS.

Sept. 11, 1928.  
J. O. CARREY  
1,683,955
BELT DRIVE FOR REFRIGERATING MACHINES
Filed April 3, 1926     2 Sheets-Sheet 2
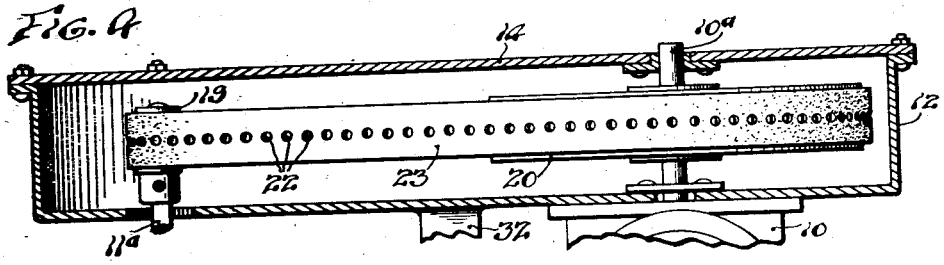
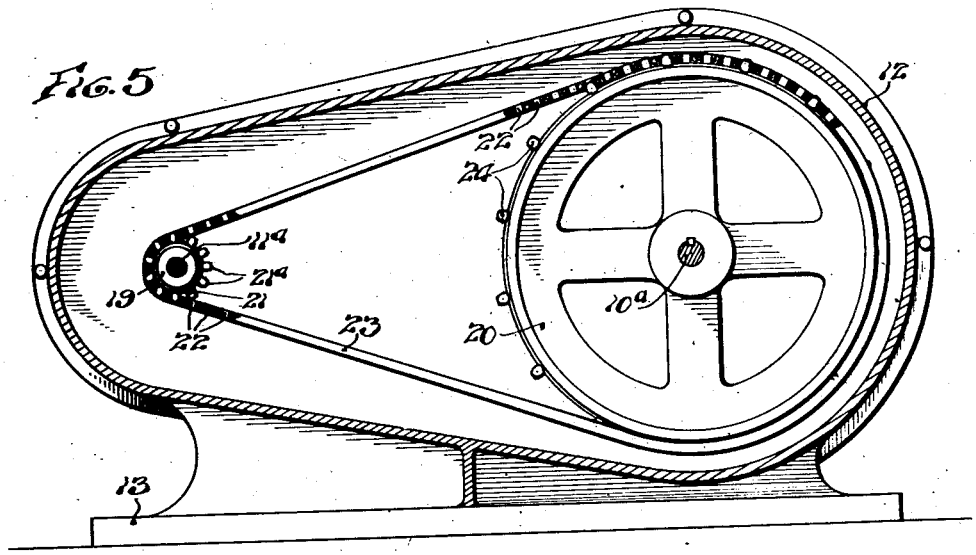
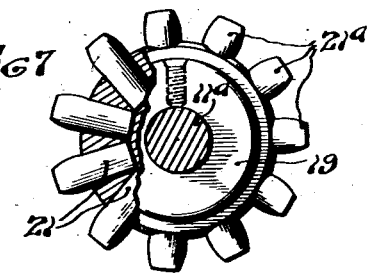
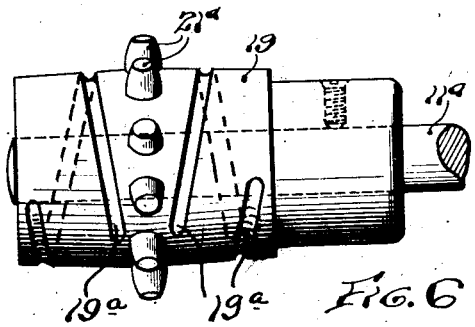
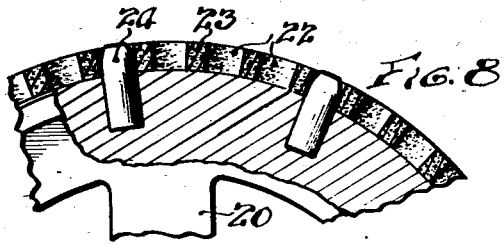
INVENTOR:  
John O. Carrey  
By Cornwall, Bedell & Janus  
ATTYS.

Patented Sept. 11, 1928.

1,683,955

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

BELT DRIVE FOR REFRIGERATING MACHINES.

Application filed April 3, 1926. Serial No. 99,502.

This invention relates to new and useful improvements in driving connections for compressors and relates more particularly to belt drives for refrigerating machines.

In the operation of refrigerating machines employing compressors, the latter is set in operation periodically and while under load. Where a belt drive is used, the motor pulley is comparatively small and in starting the compressor under load or when the load reaches a predetermined degree, slippage between the belt and the motor pulley occurs. This slippage causes loss of power and prevents the operation of the compressor at full speed and further causes heating and burning of the belt.

It is the object of the present invention to provide a belt drive which will at all times operate at the proper speed irrespective of the load and in which the slippage of the motor pulley relative to the belt is positively eliminated, thereby providing a positive drive for the compressor possessing all of the advantages of the usual belt drive.

Further objects of the invention are to provide a belt drive in which all the noises incidental to the operation of the belt at high speed over the pulley are eliminated, thereby reducing the operating noises of the refrigerator machine to minimum.

Other objects of the invention are to provide an improved mounting for the motor which is simple in construction and in which all the vibration is absorbed by the resilient parts of the mounting.

Still further objects of the invention are to provide a pulley provided on its crown with radial projections adapted to enter suitable openings formed in the belt whereby said belt is held against slipping and is in positive driving engagement with said pulley.

With these and other objects in view, my invention consists in certain novel features of construction and arrangement of parts, hereinafter more fully described and claimed and illustrated in the accompanying drawings, in which—

Figure 1 is a top plan view of a compressor and motor for actuating the same and a housing for enclosing the belt drive.

Figure 2 is a side elevational view.

Figure 3 is a vertical cross section taken on line 3—3 of Figure 1.

Figure 4 is a horizontal section taken on line 4—4 of Figure 2.

Figure 5 is a vertical section through the housing showing portions of the belt in cross section.

Figure 6 is a side elevational view of the motor pulley.

Figure 7 is an end elevational view, partly in cross section, of same.

Figure 8 is an enlarged fragmental section of the compressor pulley.

Referring by numerals to the accompanying drawings, 10 indicates the compressor of a refrigerating system which is driven by an electric motor. Compressor 10 is fixed to one of the walls of a casing 12 which is provided with a base 13 and is box-shape in cross section, being closed at one end by a removable plate or cover 14.

Extending from one side of casing 12 and preferably the same side to which compressor 10 is attached is a lug or boss 15 in which is secured a horizontally disposed pin or bolt 16. A motor mounting 17 is suspended from bolt 16 and supports motor 11, the shaft 11$^a$ of which extends through a slot 18 formed in the side wall of casing 12 into the interior of said casing. A comparatively small pulley 19 is fixed to motor shaft 11$^a$ while a comparatively large pulley 20 is fixed to shaft 10$^a$ of compressor 10. Pulley 19 is provided in its peripheral face with a series of radial projecting pins 21 which are spaced equidistant on the crown of the pulley and are adapted to enter apartures 22 formed at regular intervals in an endless belt 23 which operates over said pulley and over pulley 20. The latter is also provided with radial projections 24. However, these are spaced further apart so that only certain of the opertures are engaged by projections 24. The outer ends of projections 21 and 24 are slightly tapered as indicated at 21$^a$ and 24$^a$, respectively, to provide proper effective working surfaces between the teeth of pins 21 and 24 and apertures 22 of belt 23.

The use of pins on the peripheries of the pulleys for engaging the apertures in the belt provide positive driving engagement between the pulleys and the belt and prevent slipping of the belt off of the pulleys. In addition, it is not necessary to use belt tighteners which are generally noisy and troublesome, thereby adding to the quiet operation of the drive connections. The use of pins is particularly desirable in connection with the motor pulley 19 which is comparatively small in size and, due to the limited peripheral surface of the pulley in engagement with the belt, is under normal condition apt to slip, especially when operating under heavy load, thereby burning up the belt and rendering the operation of the compressor uncertain. Such condition is especially undesirable in operation of refrigerating apparatus where the compressor is started quite frequently during the day and the motor is required to bring the compressor in operation under heavy load. By using radial pins on the motor pulley, all danger of slippage is thereby eliminated and the compressor is positively driven at all times. The large pulley 20 is preferably provided with fly wheel sections 20ª such as disclosed in my copending application Serial No. 124,348 filed July 23, 1926, which permit the drive connections to reach their proper speed before the compressor mechanism is allowed to be set in operation.

The motor mounting 17 is preferably formed of a resilient bar bent into shape to provide a loop portion or an inverted U-shape member 25 which straddles pin 16. One leg 26 has a portion bent at right angles as indicated at 27 for receiving motor 11, said portion 27 being provided with slots 27ª whereby said motor may be adjusted relative to compressor 10. The opposite leg 28 has a portion 29 bent at right angles and is provided with an elongated slot 30 through which passes a rod 31. The lower end of this rod is secured to a lug 32 by lock nuts 33, and the upper end of said rod extends a suitable distance above portion 30 and receives a coiled spring 34, the lower end of which rests on portion 29 while the upper end engages a washer 35 held on rod 31 by a nut 36. By turning nut 36 in the proper direction, the tension of spring 34 may be regulated so as to provide proper counterbalancing means for motor 11. A layer of fabric material or similar resilient means is interposed between pin 16 and portion 25 so as to absorb vibration and prevent direct contact between the metal parts. This U-shaped portion 25 is held in position on pin 15 by means of nuts 16ª which are screw-seated on said bolt 16 and are adjustable to permit movement of mounting 17 laterally of housing 12. Leg portions 26 and 28 are clamped together by suitable fastening means 38 to prevent undue movement of mounting 17. Mounting 17 is resilient and will absorb any vibration produced by the operation of the motor or compressor, spring 34 also acting as a shock absorber to eliminate vibration of the mounting. The latter is suspended from a single point, namely, pin 16, thereby reducing to minimum the points of contact between the mounting and the rigid support.

The motor pulley is preferably provided on its periphery with suitable grooves 19ª which extend obliquely of said periphery and form pasageways by means of which air trapped between the belt 23 and the crown of the pulley is allowed to escape.

While I have shown the pins disposed in a single row on the crown of the pulley, they may be disposed thereon in any suitable manner, the apertures 22 being arranged accordingly.

I claim:

1. In a domestic refrigerating apparatus, the combination of a driven shaft, a pulley fixed on said shaft, a motor including a shaft, a pulley fixed on the latter and provided on its periphery with a series of spaced radial projections, a belt operating over said pulley and provided in its length with a series of apertures for receiving the radial projections of said motor pulley and a housing for enclosing pulleys and said belt, said housing being provided in one of its walls with openings for receiving said shafts.

2. In a refrigerating apparatus, the combination of a driven mechanism including a shaft, a pulley fixed on said shaft, a motor including a shaft, a comparatively small pulley fixed on the latter, a series of pins extending radially from the periphery of said pulley and arranged at regular intervals thereon, the projecting ends of said pins being tapered, an endless non-metallic belt operating over said pulleys and provided in its length with a series of round apertures spaced to coincide with and receive said pins and form a positive drive between said pulleys and said belt and a housing for enclosing said pulleys and said belt, and provided in one of its walls with openings for receiving said shafts.

3. In a domestic refrigerating apparatus, the combination of a driven mechanism including a shaft, a pulley fixed on said shaft, a series of pins extending radially at regular intervals from the periphery of said pulley and having tapered ends, a motor including a shaft, a comparatively small pulley fixed on the latter, a series of pins extending radially from the periphery of said pulley and spaced at regular intervals, said pins having their projecting ends tapered, a non-metallic belt operating over said pulleys and provided in its length with a series of round apertures adapted to be engaged by said radial pins to form positive drive between said belt and said pulleys and a housing secured to said compressor and enclosing said pulleys and said belt, said housing being provided in one of its walls with openings for receiving said shafts.

4. In a refrigerating apparatus, the combination of a driven mechanism including a shaft, a comparatively large pulley fixed on said shaft and provided on its periphery with radial projections spaced equidistant apart, a resilient mounting having a single point of suspension, a motor supported on said mounting, said motor including a shaft, a comparatively small pulley fixed on said motor shaft and provided on its periphery with a series of radial projections spaced equidistant apart, and a belt operating over said pulleys and provided in its length with an endless row of apertures adapted to be engaged by said radial projections to form a positive drive between said pulleys and said belt.

In testimony whereof I hereunto affix my signature this 27th day of March, 1926.

JOHN O. CARREY.